United States Patent [19]

Carleton et al.

[11] 4,055,548

[45] Oct. 25, 1977

[54] STORAGE-STABLE LIQUID POLYISOCYANATE COMPOSITION

[75] Inventors: Peter S. Carleton, Branford; James H. Ewen, Jr., New Haven; Harold E. Reymore, Jr., Wallingford, all of Conn.

[73] Assignee: The Upjohn Company, Kalamazoo, Mich.

[21] Appl. No.: 724,401

[22] Filed: Sept. 17, 1976

[51] Int. Cl.$^2$ .................. C08G 18/76; C08G 18/14; B29D 27/00
[52] U.S. Cl. ............... 260/77.5 AT; 260/2.5 AT; 260/2.5 AY; 260/2.5 BD; 260/75 NT; 260/453 SP; 260/453 P; 260/453 AR; 264/50
[58] Field of Search ............... 260/77.5 AT, 77.5 SS, 260/75 NT

[56] References Cited

U.S. PATENT DOCUMENTS 3,644,457  2/1972  Koenig et al. ............... 260/77.5 AT Primary Examiner—H.S. Cockeram
Attorney, Agent, or Firm—James S. Rose; Denis A. Firth

[57] ABSTRACT

A novel liquid isocyanate prepolymer composition is disclosed. The prepolymer is obtained by reacting a polymethylene polyphenylisocyanate containing from about 65 to about 85 percent by weight of methylenebis(phenylisocyanate) the remainder of said polymethylene polyphenylisocyanates having a functionality greater than 2, with from about 0.0185 to about 0.15 equivalent per equivalent of said polyphenylisocyanate of a polyoxyethyleneglycol having an average molecular weight of from about 200 to about 600. The liquid isocyanates so produced are characterized as storage stable liquids of relatively low viscosity which when used as the isocyanate component in polyurethane formulations, particularly molded polyurethanes, give rise to highly resilient and useful molded products.

6 Claims, No Drawings

STORAGE-STABLE LIQUID POLYISOCYANATE COMPOSITION

BACKGROUND OF THE INVENTION

1. Field of the Invention

This invention relates to novel isocyanate containing compositions and to a process for their preparation and is more particularly concerned with novel, storage stable prepolymer compositions derived from polymethylene polyphenylisocyanates.

2. Description of the Prior Art

The formation of storage stable liquid isocyanate containing compositions derived from pure methylenebis(phenylisocyanate) and minor amounts of a diol are known in the art; see U.S. Pat. Nos. 3,394,164 and 3,394,165. Storage stable liquid isocyanate compositions having an average isocyanate functionality greater than 2 and which do not crystallize, have been prepared from polymethylene poly(phenylisocyanates) and a polyoxyalkylene diol or alkylene diol as disclosed in German Pat. application No. 2,513,793. Liquid mixtures consisting of polymethylene poly(phenylisocyanates) and methylenebis(phenylisocyanate) partly reacted with a glycol have been disclosed in German Patent Application No. 2,513,796.

The polymethylene polyphenylisocyanates referred to hereinabove are generally produced by phosgenation of a mixture of polyamines produced by acid condensation of formaldehyde and aniline; see for example, U.S. Pat. Nos. 2,683,730, 2,950,263, and 3,012,008.

Storage stable liquid isocyanate prepolymer compositions are useful in the preparation of molded polyurethane parts, and microcellular shoe soles; see "Microcellular Elastomers in Footwear," by P. S. Carleton, J. H. Ewen, H. E. Reymore, and A. A. R. Sayigh, J. Cellular Plastics, Vol. 10, page 1, 1974. A particularly advantageous method for the preparation of polyurethanes in which storage stable liquid isocyanate prepolymers find particular utility is referred to synonymously as liquid reaction molding (LRM) or reaction injection molding (RIM); see Liquid Reaction Molded Polyurethanes by F. E. Critchfield, National Technical Conference of the Society of Plastics Engineers, page 64, Nov. 12, 1974 for a detailed discussion of the method.

For an isocyanate composition to be useful in RIM technology, it must meet certain requirements with respect to such factors as isocyanate functionality, viscosity, storage stability, polymer demolding characteristics, and particularly the mechanical properties of the polyurethane material produced therefrom.

We have unexpectedly discovered that when a polyoxyethylene glycol which falls within a specifically narrow molecular weight range is reacted with a polymethylene polyphenylisocyanate within a narrow range of proportions there are produced storage stable liquid isocyanate prepolymer compositions which possess the requisite properties to allow their use in RIM technology and microcellular shoe sole preparation. Surprisingly, the isocyanate compositions give rise to polyurethane polymers which have superior mechanical and demolding properties compared to those polyurethanes prepared from the storage stable isocyanates prepared in accordance with the prior art.

SUMMARY OF THE INVENTION

This invention comprises a liquid isocyanate prepolymer composition comprising the product obtained by bringing together (i) a polymethylene polyphenylisocyanate containing from about 65 to about 85 percent by weight of methylenebis(phenylisocyanate) the remainder of said polymethylene polyphenylisocyanates having a functionality greater than 2 with (ii) from about 0.0185 to about 0.15 equivalent per equivalent of said polyphenylisocyanate of a polyoxyethyleneglycol having an average molecular weight from about 200 to about 600.

The present invention also comprises the process for the preparation of said liquid isocyanate prepolymer composition set forth above. By the term "liquid" is meant a material which remains liquid at temperatures of about 10° C or higher.

It is also an object of the present invention to convert a polymethylene polyphenylisocyanate, rich in methylenebis(phenylisocyanate), which normally deposits solids on standing at room temperature (i.e. about 15° to about 20° C) into a storage stable liquid isocyanate prepolymer composition which does not deposit solids on standing at room temperature for prolonged periods.

DETAILED DESCRIPTION OF THE INVENTION

The liquid isocyanate prepolymer compositions of the present invention are achieved by bringing together a minor amount of a polyoxyethyleneglycol and a polymethylene polyphenylisocyanate rich in methylenebis(phenylisocyanate) content using reaction techniques well known to those skilled in the art.

The polymethylene polyphenylisocyanate employed in the present invention has a content of methylenebis(phenylisocyanate) (MDI) from about 65 percent by weight to about 85 percent by weight, preferably from about 65 to about 75 percent by weight, the remainder of said material being polymethylene polyphenylisocyanates having a functionality greater than 2. It is to be understood that this MDI content can be present either as a direct result of its formation during the preparation of the polymethylene polyphenylisocyanate or by the admixture of additional pure MDI to a polymethylene polyphenylisocyanate mixture until a concentration of MDI within the above ranges is achieved.

Additionally, the present invention includes those polymethylene polyphenylisocyanates which normally contain an MDI isomer content of about 90 percent of the para, para'- isomer, and about 10 percent of the corresponding ortho, para'- isomer. It is to be understood that very minor amounts, less than about 1 percent of the ortho, ortho'- isomer may be present. Preferably, the para, para'- isomer content is at least about 96 percent by weight and the ortho, para'- isomer content is up to about 4 percent by weight; see U.S. Pat. No. 3,892,634 for a method of increasing para, para'- content.

The polyoxyethyleneglycol reactant has an average molecular weight from about 200 to about 600, and preferably from about 300 to about 500. A most preferred average molecular weight is about 400.

The polyoxyethyleneglycol is employed in a range of from about 0.0185 equivalent to about 0.15 equivalent, preferably from about 0.02 equivalent to about 0.10 equivalent, per equivalent of said polyphenylisocyanate.

These polyoxyethyleneglycols are well known to those skilled in the art, being commercially available, and are generally prepared by the addition of ethylene oxide to water, ethylene glycol, diethylene glycol, or the like, until the requisite average molecular weight is reached; see Union Carbide Corp., 270 Park Ave., New York, N. Y., 1975 – 1976 Chemicals and Plastics Physical Properties, page 12.

The process of the invention is carried out simply by bringing together the polymethylene polyphenylisocyanate and the glycol in any desired manner. Any suitable reaction vessel may be employed such as a resin kettle, flask, or reactor vessel. The reactants may be blended and stirred at room temperature or at an elevated temperature to accelerate the process. Catalysts for the reaction of a hydroxyl group with an isocyanate may be optionally employed but are not necessary; see Saunders and Frisch, Polyurethanes Chemistry and Technology, Part I, page 161 et seq, Interscience Publishers, New York (1962) for typical catalysts. The liquid isocyanate prepolymer composition is obtained as a mobile dark brown liquid and is stored using reasonable precautions to exclude moisture and air.

The process is preferably carried out under an atmosphere of nitrogen and at a temperature of from about 20° to about 90° C, preferably 25° to 80° C, for a period from about 0.5 hour to about 8 hours, and preferably from about 1 hour to about 4 hours.

Optionally, antioxidants, preservatives, and the like may be added during the preparation of the prepolymer, or after the isocyanate composition has been obtained.

The liquid isocyanate prepolymer compositions of the present invention are characterized by a viscosity determined in centipoises (cps) at 25° C of from about 130 to about 2800, and preferably from about 130 to about 500. Furthermore, the compositions are storage stable and remain liquid without depositing solids when stored for prolonged periods at 10° C or higher. If solidification does occur when the composition is exposed to lower temperatures, the composition is simply heated to about 45° C to reform the stable liquid composition.

A further advantage of the present invention is that the liquid isocyanate prepolymers are extremely soluble in other polyol components when preparing polyurethane polymers, particularly, in those formulations which are useful in RIM technology. Additionally, the low viscosities of the isocyanate prepolymers, particularly those in the viscosity range of 130 to 500 cps, make them particularly useful in RIM procedures.

It is well known to those skilled in the art that, when a polymethylene polyphenylisocyanate mixture is subjected to a number of freeze-thaw cycles, as can easily happen under winter storage conditions, solid formation occurs primarily because of the formation of MDI dimer and crystallized MDI. Surprisingly, the present isocyanate compositions can be subjected to many freeze-thaw cycles with little or no solids formation.

However, it is in the properties of the polyurethanes produced from the isocyanate compositions of the present invention wherein the most surprising effects reside. The physical properties, including demolding characteristics, of these polyurethanes are superior to those obtained using an isocyanate which has been prepared from an equivalent amount of a polyoxypropyleneglycol, in accordance with the prior art, in place of the polyoxyethyleneglycols used in the present invention. Polyurethane plaques prepared from the polyoxypropyleneglycol-treated isocyanate are characterized as "dead," even after efficient curing, lacking in resilience, and can be visibly characterized as translucent to transparent. Contrastingly, plaques prepared from the polyoxyethyleneglycol based isocyanate prepolymers are characterized by high resiliency, even prior to complete curing, and are visibly characterized as opaque.

The storage stable liquid isocyanate prepolymer compositions obtained in accordance with the present invention can be used for all purposes for which the original unmodified polymethylene polyphenylisocyanates can be used. Accordingly, polyurethanes can be obtained by the reaction of said isocyanate compositions with compounds containing two or more hydroxyl groups using any of the methods for the preparation of polyurethanes well known to those skilled in the art. Thus the isocyanate compositions of the invention can be used in the preparation of a variety of polyurethanes which includes cellular, non-cellular, or micro-cellular. Such polyurethanes include semi-rigid and rigid foams, high modulus elastomers, coatings, and the like; see Saunders and Frisch, Polyurethanes Chemistry and Technology, Part II, Interscience Publishers, New York (1962), and the references cited supra for various methods of polyurethane formation.

The liquid isocyanate compositions of the invention find particular utility in micro-cellular polyurethane shoe sole formulations and reaction injection molded (RIM) polyurethane parts; see references cited supra for teachings of preparative methods thereof. The RIM produced polyurethanes, because of their high resilience over a wide range of temperatures can be used in the production of decorative facia panels which cover energy absorbing systems such as automotive bumpers and the like. Also the isocyanates can be used in the preparation of high density self-skinning rigid foams used in the preparation of furniture parts.

The following examples describe the manner and process of making and using the invention and set forth the best mode contemplated by the inventors of carrying out the invention but are not to be construed as limiting.

EXAMPLE 1

A 250 ml. resin flask equipped with a stirrer, thermometer, and a nitrogen inlet tube was charged with 91.91 g. (0.704 equivalent) of a polymethylene polyphenylisocyanate having a methylenebis(phenylisocyanate) content of 65 percent by weight with the remaining 35 percent being a mixture of polymethylene polyphenylisocyanates having a functionality greater than 2 and wherein the methylenebis(phenylisocyanate) consisted of 97 percent of the 4,4'-isomer and 3 percent of the 2,4'-isomer, and 8.08 g. (0.04 equivalent) of a polyoxyethyleneglycol having a molecular weight of 400 (Carbowax 400, supplied by Union Carbide Corp., 270 Park Ave., New York, N. Y.). Under a blanket of nitrogen, the reactants were stirred for about two hours. A slight exotherm (temperature rose to about 50° C) was observed during this period. There was thus obtained a dark brown liquid isocyanate prepolymer composition in accordance with the present invention which was characterized by a viscosity of 170 cps at 25° C, an Isocyanate Equivalent = 153.5, and a freezing point of 5° C.

The reactivity of the isocyanate composition prepared above was determined initially and then after about 6 months of storage at room temperature under nitrogen by preparing identical hand-mix polyurethane samples according to the following formulation and measuring the reaction profiles. The ingredients, which are set forth in parts by weight, were weighed into a 1 quart cup as A and B components and thoroughly mixed for 10 seconds using an electric drill press equipped with a stirrer blade. The mixture was then immediately poured into an 8 oz. paper cup where it was allowed to react freely and the reaction characteristics measured. The measured times for the initial preparation and after 6 months had elapsed are shown following the formulation below.

| Formulation (in parts by weight) | |
|---|---|
| Component A: | |
| Isocyanate composition | 103.45 |
| Component B[1]: | |
| CP4701[2] | 100.00 |
| 1,4-Butanediol | 27.00 |
| L-5303[3] | 1.00 |
| Dibutyltin didodecylmercaptide | 0.14 |
| Dibutyltin diacetate | 0.06 |
| Lead naphthenate[4] | 0.12 |

Footnotes:
[1]Component B was freshly formulated for each test. Only the isocyanate composition (Component A) was aged.
[2]CP4701 is a polyoxyalkylene triol supplied by Dow Chemical Co., Midland, Mich., Equivalent Weight = 1670.
[3]L-5303 is a silicone surfactant supplied by Union Carbide Corp., 270 Park Ave., New York, N. Y.
[4]A solution of 24 percent by weight of lead naphthenate dissolved in mineral spirits and supplied by Tenneco Chemicals, Piscataway, N. J.

| | Reaction Profile (in seconds) | |
|---|---|---|
| | Initial | After 6 months |
| Cream | 14 | 16 |
| Gel | 15 | 17 |
| Tack free | 16 | 18 |
| Rise* | 18 | 18 |

*Actual rise is only slight and due primarily to the expansion of trapped air incorporated during the mixing of the components in the cup.

The rise times which are detectable when using hand-mix procedures are typical for a formulation which can be used in the RIM production of a polyurethane material. No similar rise can be seen when the components are mixed in high pressure impingement mixing equipment of the type found in RIM production. Fresh B component was used with each test thereby eliminating any aging factor that might have been introduced by the B components. Virtually identical rise profiles were obtained which clearly demonstrates the storage stability of the liquid isocyanate prepolymer composition.

Contrastingly, when the isocyanate composition of Component A in the test formulation was replaced by the equivalent amount of a liquid isocyanate composition having an I.E. of 184 and prepared from the same polymethylene polyphenylisocyanate starting material above and a polyoxypropyleneglycol of molecular weight of 2025, it was found that, after a 6 month storage period, a 35 percent increase in gel and tack free times had occurred.

The isocyanate composition prepared as described above did not deposit solids on standing at 20° C for prolonged periods (9–12 months) whereas the polymethylene polyphenylisocyanate from which it was derived forms solids on standing within 24–48 hours which must be melted in a steam chest to obtain homogeneous material but which, when cooled to 25° C, either reforms the solids [methylenebis(phenylisocyanate) and/or its dimer as shown by infrared absorption at 1765 cm$^{-1}$ and gel permeation chromatography] or results in a viscosity increase from its normal 30 cps at 25° C to 90 - 100 cps.

A freeze-thaw cycling test was carried out with the isocyanate composition prepared as described above in which one cycle consisted of exposing the sample to the following thermal conditions: first at $-10°$ C for 24 hours, second at 21°–23° C for 8 hours, and third at 46° C for 16 hours. These temperatures were chosen because the liquid isocyanate solidified quickly at $-10°$ C and melted rapidly at 46° C. After 15 complete cycles the liquid sample showed a small amount of solids formation (less than one-fourth inch in the bottom of a quart jar). However, this is to be expected because the dimer content of methylenebis(phenylisocyanate) was being enhanced by exposing the solid isocyanate composition to temperatures near or slightly above room temperature when the sample was in the transition between the first and second part of the cycle. Noteworthy was the constancy of the viscosities and isocyanate equivalents between the initial values and those measured after completion of the 15 cycles as shown below.

Initial viscosity at 25° C = 170 cps
Final viscosity at 25° C = 226 cps
Initial I.E. = 153.5
Final I.E. = 155

EXAMPLE 2

Using the apparatus set forth in Example 1 and the ingredients in parts by weight set forth in Table I there were prepared the storage stable liquid isocyanate prepolymer compositions of Samples 1 through 6 in accordance with the present invention. Samples 7 through 9 are not in accordance with the present invention.

The starting polymethylene polyphenylisocyanate was identical to that described in Example 1 and was charged to the resin kettle, heated to about 70° C and the anhydrous polyoxyethyleneglycols (PEG) having the molecular weights and proportions thereof set forth in Table I were added to the stirred polyisocyanate. The reaction mixtures exothermed to about 80° C and stirring was continued for 1 hour and cooled if the temperature exceeded 85° C.

Samples 1 through 6 remained as storage stable liquids whereas those isocyanate compositions prepared with the 1000 M.W. and 2000 M.W. PEG materials formed partially solid to solid isocyanate compositions.

TABLE I

| Sample No. | PEG Type (pts. by wt.) | Polyisocyanate (pts. by wt.) | Product I.E. | Visc. (cps. at 25° C) |
|---|---|---|---|---|
| | 200 MW: | | | |
| 1. | 5.79 | 94.2 | 159 | 320 |
| 2. | 12.5 | 87.5 | 179 | 2750 |
| | 400 MW: | | | |
| 3. | 8.08 | 91.91 | 153 | 180 |
| 4. | 16.83 | 83.16 | 177 | 1040 |
| | 600 MW: | | | |
| 5. | 9.30 | 90.69 | 153 | 180 |
| 6. | 19.3 | 80.6 | 183 | 730 |
| | 1000 MW: | | | |
| 7. | 10.5 | 89.4 | 150 | Partially solid |
| 8. | 22.74 | 77.25 | 187 | Partially solid |
| | 2000 MW: | | | |
| 9. | 25.3 | 74.6 | 180 | Solid |

EXAMPLE 3

Using the liquid isocyanate prepolymer compositions prepared as in Example 2, Samples 1, 3, and 5, in accordance with the present invention and the other ingredients and proportions by weight set forth in Table II there were prepared three molded polyurethane plaques. Each sample was prepared using the method set forth in Example 1 but immediately after the ingredients had been mixed for 10 seconds in the 1 qt. cup the mixture was poured into an 8 inch × 8 inch × ⅛ inch clamped mold which was coated with a microcrystalline wax release agent, P-5-Cl (supplied by Chemtrend Chem. Corp., Howell, Mich.) and which had been heated to 150° F prior to the charge. The plaques were demolded in 1 to 2 minutes and aged at 20°–25° C at least 2 days before being tested.

The physical properties of the test plaques clearly show the excellent properties of the polyurethane material. Noteworthy are the flexural moduli of these samples over the range of −20° F which to 158° F which shows their retention of strength over this temperature range. Particularly noteworthy in this regard in plaque PEG-400-3.

TABLE II

| Plaque | PEG-200-1 | PEG-400-3 | PEG-600-5 |
|---|---|---|---|
| Ingredients (parts by wt.): | | | |
| Component A (Isocyanate): | | | |
| Sample 1 (159 I.E.) | 78.7 | | |
| Sample 3 (153 I.E.) | | 102 | |
| Sample 5 (153 I.E.) | | | 103 |
| Component B: | | | |
| CP4701 | 100 | 100 | 100 |
| 1,4-Butanediol | 20 | 29 | 27 |
| L-5303 | 1 | 1 | 1 |
| Dibutyltin didodecyl-mercaptide | 0.14 | 0.14 | 0.14 |
| Dibutyltin diacetate | 0.06 | 0.06 | 0.06 |
| Lead naphthenate | 0.12 | 0.12 | 0.12 |
| Rise characteristics: (seconds) | | | |
| Cream | 13 | 14 | 13 |
| Gel | 15 | 15 | 15 |
| Tack free | 16 | 16 | 17 |
| Rise | 18 | 18 | 18 |
| Physical properties: | | | |
| Density, g/ml | 1.06 | 1.06 | 1.07 |
| Hardness, Shore D (ASTM D2240) | 49 | 50 | 50 |
| Flexural Modulus (psi) (ASTM D790B) | | | |
| at −20° F | — | 119,700 | 72,655 |
| at 75° F | — | 23,620 | 14,900 |
| at 158° F | — | 4,321 | — |
| Heat sag at 250° F, inches* | — | 0.72 | 1.025 |
| Tensile str. (psi) (ASTM D-412) | 1667 | 2260 | 2040 |
| Elongation, % | 73 | 60 | 65 |
| Die "C" tear, pli (ASTM C273) | 368 | 465 | 385 |

*Test CTZ ZZOO6AA of the Chevrolet Division of General Motors Corp., Flint, Mich.

EXAMPLE 4

Using the liquid isocyanate prepolymer compositions prepared as in Example 2, Samples 2, 4, and 6, in accordance with the present invention and the other ingredients and proportions by weight set forth in Table III, and the procedure outlined in Example 3 there were prepared three molded polyurethane plaques having the physical properties set forth in Table III.

TABLE III

| Plaque | PEG-200-2 | PEG-400-4 | PEG-600-6 |
|---|---|---|---|
| Ingredients (parts by weight): | | | |
| Component A (Isocyanate): | | | |
| Sample 2 (179 IE) | 84.0 | | |
| Sample 4 (177 IE) | | 119.1 | |
| Sample 6 (183 IE) | | | 135.6 |
| Component B: | | | |
| CP4701 | 100 | 100 | 100 |
| 1,4-Butanediol | 18 | 27 | 30 |
| L-5303 | 1 | 1 | 1 |
| Dibutyltin didodecyl mercaptide | 0.14 | 0.14 | 0.14 |
| Dibutyltin diacetate | 0.06 | 0.06 | 0.06 |
| Lead naphthenate | 0.12 | 0.12 | 0.12 |
| Rise Characteristics: (seconds) | | | |
| Cream | 13 | 13 | 13 |
| Gel | 15 | 14 | 15 |
| Tack free | 16 | 15 | 17 |
| Rise | 18 | 16 | 18 |
| Physical Properties: | | | |
| Density, g./ml | 1.07 | 1.07 | 1.04 |
| Hardness, Shore D | 51 | 51 | 50 |
| Flexural Modulus (psi) | | | |
| at −20° F | 111,000 | 111,250 | 77,420 |
| at 75° F | 10,560 | 14,200 | 9,895 |
| at 158° F | — | 1,515 | — |
| Heat sag at 250° F, inches | 1.33 | 0.625 | 1.22 |
| Tensile, str. (psi) | 1760 | 1760 | 1830 |
| Elongation, % | 60 | 50 | 60 |
| Die "C" tear, pli | 380 | 365 | 320 |

EXAMPLE 5

An isocyanate composition not in accordance with the present invention was prepared by reacting 82.21 g. (0.63 equivalent) of the polymethylene polyphenylisocyanate set forth in Example 1 with 17.78 g. (0.084 equivalent) of a polyoxypropyleneglycol having a molecular weight of 425 and using the procedure set forth in Example 1. The isocyanate composition was characterized by a viscosity of 1775 cps at 25° C and an isocyanate equivalent = 186.

Using 139.97 parts of this isocyanate composition as Component A and Component B comprised of the same ingredients and proportions by weight set forth for sample PEG-200-1 in Table II of Example 3 except that 30 parts of 1,4-butanediol was employed, there was prepared a polyurethane plaque according to the procedure of Example 3. When the plaque was demolded it was extremely "dead", that is to say, it was easily distorted or twisted and would not snap back to the original flat plaque shape. Furthermore, upon curing by aging it remained "dead".

We claim:

1. A liquid isocyanate prepolymer composition which has a viscosity determined in centipoises at 25° C of from about 130 to about 2800 and which can be subjected to many freeze-thaw cycles with little or no solids formation comprising the product obtained by bringing together and reacting (i) a polymethylene polyphenylisocyanate containing from about 65 to about 85 percent by weight of methylenebis(-phenylisocyanate) the remainder of said polymethylene polyphenylisocyanates having a functionality greater than 2 and (ii) from about 0.0185 to about 0.15 equivalent, per equivalent of said polyphenylisocyanate, of a polyoxyethyleneglycol having an average molecular weight from about 200 to about 600.

2. A liquid isocyanate prepolymer composition according to claim 1 wherein said methylenebis(-phenylisocyanate) is comprised of a para, para'- isomer content of at least about 96 percent by weight and an ortho, para'- isomer content up to about 4 percent by weight.

3. A liquid isocyanate prepolymer composition according to claim 1 wherein said polyoxyethyleneglycol has an average molecular weight of about 400.

4. A liquid isocyanate prepolymer composition which has a viscosity determined in centipoises at 25° C of from about 130 to about 2,800 and which can be subjected to many freeze-thaw cycles with little or no solids formation comprising the product obtained by bringing together and reacting (i) a polymethylene polyphenylisocyanate containing from about 65 to about 85 percent by weight of methylenebis(phenylisocyanate) the remainder of said polymethylene polyphenylisocyanates having a functionality greater than 2 and wherein said methylenebis(phenylisocyanate) is comprised of a para, para'- isomer content of at least about 96 percent by weight and an ortho, para'- isomer content up to about 4 percent by weight and (ii) from about 0.02 equivalent to about 0.10 equivalent, per equivalent of said polyphenylisocyanate, of a polyoxyethyleneglycol having an average molecular weight of about 400.

5. A liquid isocyanate prepolymer composition according to claim 4 wherein about 0.06 equivalent of said polyoxyethyleneglycol per equivalent of said polyphenylisocyanate is employed.

6. A polyurethane obtained by the reaction of a liquid isocyanate prepolymer composition according to claim 1 with a compound containing two or more hydroxyl groups.

* * * * *